(12) United States Patent
Nelson et al.

(10) Patent No.: US 6,335,091 B2
(45) Date of Patent: Jan. 1, 2002

(54) ADHESIVE TAPE AND PRODUCTS MADE THEREFROM

(75) Inventors: Thomas J. Nelson, Belton; Robert R. Krebs, Georgetown, both of TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 11 days.

(21) Appl. No.: 09/749,776

(22) Filed: Dec. 28, 2000

Related U.S. Application Data

(62) Division of application No. 09/257,174, filed on Feb. 25, 1999.

(51) Int. Cl.[7] .................................................. B32B 7/12
(52) U.S. Cl. ..................... 428/349; 428/200; 428/202; 428/261; 428/290; 428/317.1; 428/317.3; 428/317.7; 428/319.3; 428/319.7; 428/343; 428/346; 428/347; 428/349; 428/351; 428/352; 428/355; 156/241; 156/274.8; 156/275.1; 156/275.3
(58) Field of Search ................................ 428/200, 202, 428/261, 290, 317.1, 317.3, 317.7, 319.3, 319.7, 343, 346, 347, 349, 351, 352, 355; 156/241, 274.8, 275.1, 275.3

(56) References Cited

U.S. PATENT DOCUMENTS

| | | | |
|---|---|---|---|
| 4,070,532 A | | 1/1978 | Hammer .................... 526/11.2 |
| 4,089,721 A | * | 5/1978 | Sauder ........................ 156/212 |
| 4,157,428 A | | 6/1979 | Hammer ...................... 521/134 |
| 4,265,801 A | | 5/1981 | Moody et al. ............. 260/40 R |
| 4,348,491 A | | 9/1982 | Bertolucci et al. .......... 523/214 |
| 4,434,261 A | | 2/1984 | Brugel et al. ................ 524/109 |
| 4,489,193 A | | 12/1984 | Goswami .................... 525/190 |
| 5,130,185 A | | 7/1992 | Ness ........................... 128/40 |
| 5,166,266 A | | 11/1992 | Machado et al. ........... 525/134 |
| 5,276,419 A | | 1/1994 | Griffin et al. ............... 335/216 |
| 5,322,098 A | | 6/1994 | Christianson et al. ....... 141/279 |
| 5,376,419 A | * | 12/1994 | Foster et al. ................ 428/40 |
| 5,385,987 A | | 1/1995 | Hamazaki et al. .......... 525/445 |
| 5,447,789 A | | 9/1995 | Griffin ....................... 428/308.4 |
| 5,624,737 A | | 4/1997 | Fairbanks et al. .......... 428/198 |
| 5,869,593 A | | 2/1999 | Helmeke et al. ............... 528/83 |
| 5,971,869 A | | 10/1999 | Rajagopalan et al. ........ 473/371 |
| 6,030,705 A | * | 2/2000 | Buoniconti et al. .......... 428/412 |

FOREIGN PATENT DOCUMENTS

| | | | |
|---|---|---|---|
| DE | 3331016 | 10/1984 | |
| EP | 279777 | 8/1988 | |
| EP | 816459 | 1/1998 | |
| EP | 881066 | 12/1998 | |
| GB | 1567375 | 5/1980 | |
| JP | 48-26228 | 4/1973 | |
| WO | WO 95/09200 | 4/1995 | |
| WO | WO 99/06209 | 2/1999 | ........... B32B/21/08 |
| WO | WO 99/06210 | 2/1999 | ........... B32B/21/08 |

OTHER PUBLICATIONS

European Search Report, , (Apr. 7, 2001).
European Search Results EP99116181, , .
Translation of Japanese Examiner's Comments for Japanese Search Results 4826228 Received May 17, 2000, , .

* cited by examiner

*Primary Examiner*—Mark Kopec
*Assistant Examiner*—Charles Boyer
(74) *Attorney, Agent, or Firm*—Welsh & Flaxman LLC

(57) ABSTRACT

A polymeric adhesive tape including a first polymeric adhesive layer which is a heat activated film and a second polymeric adhesive layer which is a heat activated film is disclosed. The tape is designed for use in the fabrication of articles wherein the polymeric adhesive tape secures a first member to a support surface. A method for bonding adjacent sheets to a substrate is also disclosed. In accordance with the disclosed method, a substrate is prepared for application of a first sheet and a second sheet, a polymeric adhesive tape is positioned on the substrate at a position along which the seam between the first sheet and the second sheet will be located, the first sheet and the second sheet are laid on the substrate such that the seam between the first sheet and the second sheet lies along the polymeric adhesive tape, and the adhesive tape is heated along the seam to bond the substrate, adhesive tape, first laminate and second laminate.

15 Claims, 8 Drawing Sheets

ADHESIVE TAPE AND PRODUCTS MADE THEREFROM

RELATED APPLICATION INFORMATION

This application is a divisional of U.S. Patent Application Ser. No. 09/257,174, filed Feb. 25, 1999 sending, entitled "Adhesive Tape and Products Made Therefrom", which is currently pending.

BACKGROUND OF THE INVENTION

1. Field of the Invention

The present invention relates to an adhesive tape and products made therefrom. More particularly, the present invention relates to a three-layer moisture barrier adhesive tape useful in a wide variety of applications.

2. Description of the Prior Art

Decorative laminates prepared by heat and pressure consolidation have been produced commercially for a number of years, and have found widespread acceptance in the building and furniture industry as counter and table tops, bathroom and kitchen work surfaces, wall paneling, partitions and doors. Such decorative laminates can be described as containing a number of laminae consolidated to form a unitary structure carrying a surface decoration which can range from something as simple as a solid color to something as complex as an embossed simulated wood grain finish.

In many instances, decorative laminates are bonded to a reinforcing substrate, such as plywood, hardboard, fiber board, particle board or the like. Adhesives such as contact adhesives, urea-formaldehyde, white glues (polyvinyl acetate emulsions), hot melts, phenolic or resorcinol-formaldehyde epoxy, coal tar, animal glues, and the like are commonly used to secure decorative laminates to a reinforcing substrate. The adhesives vary in their cost and reliability.

While the adhesives previously used within the industry have proven to be somewhat reliable, the prior adhesives feature many limitations. For example, the size of some decorative laminate countertops often necessitates the placement of two adjacent pieces of decorative laminate upon the substrate. As such, a seam must be included on the countertop.

As those skilled in the art will readily appreciate, a seam in a countertop represents the weak point of the entire countertop. Specifically, seams are susceptible to water penetration, resulting in swelling of the substrate and subsequent delamination of the laminate. In addition, water penetration weakens the adhesive adjacent to the seam, allowing the decorative laminate to deflect upwardly in an unsightly manner.

Decorative laminates are manufactured within a certain thickness tolerance. The tolerance results in thickness variations making it very difficult to align the decorative surfaces at a seam. As a result, adjacent laminates along a seam are generally not perfectly coplanar. Any difference in thickness along a seam creates an undesirable ridge and prevents a countertop, for example, from creating the appearance of a continuous, integral surface.

Laminate seams are subject to spreading and contracting over time due to environmental conditions. Specifically, exposure to varying heat and/or moisture conditions may cause a substrate and/or laminate to expand or contract. Since the seam represents a weak point in the countertop, expansion or contraction of the substrate and/or laminate results in movement of the seam in an undesirable manner.

The problems associated with the expansion and contraction of decorative laminate products manifests itself at the corner of laminated articles where the layers of the decorative laminate overlap each other along the edge seam. Delamination or movement caused by environmental conditions causes the laminate to loosen and become subject to damage or breakage. The edge of the decorative laminate at the corner may expand and protrude beyond the corner. The exposed edge is subject to being caught by anything that rubs up against it and, thereby, being easily broken or damaged. Examples of this are broken laminates on the corners of restaurant table edges, cabinet door or drawer corners, desk corners etc.

Additionally, adhesives commonly employed are very messy and present many problems in both the large scale production of decorative laminate products and the small scale production of decorative laminate products. Specifically, adhesives used in the large scale production of decorative laminate products present a continual problem with the machinery used during the production process. A battle must be continually fought to keep the adhesive from transferring onto, and contaminating, equipment.

Traditional adhesives also present problems when decorative laminate products are produced on a smaller scale. For example, where a decorative countertop is assembled within a consumer's home, the craftsman must be continually aware of potential damage that can be caused by spilled adhesive.

The common use of adhesive also presents problems where a layer of adhesive is used between a substrate and a thin piece of decorative laminate. Specifically, imperfections or flaws in the surface finish of the substrate can telegraph through the decorative laminate, adversely affecting the manufactured finish of the decorative laminate.

Telegraphing is also a problem where decorative laminates are wrapped about a piece of molding substrate, or other tooled substrate, to create laminated molding. Since the molding substrate is commonly machined with rotary knife blades, unevenness is created in the resulting molding substrate surface. This unevenness telegraphs through the decorative laminate after it is bonded to the substrate. Special backers have been positioned between the substrate and the decorative laminate to minimize the telegraphing. The need for such backers increases manufacturing costs due to the additional time and materials needed.

Based upon the foregoing, a need exists for an improved bonding technique, as well as products manufactured in accordance with the improved bonding technique. The present invention provides an improved adhesive tape which may be readily employed to overcome the shortcoming of prior art techniques and to solve the problems discussed above.

SUMMARY OF THE INVENTION

It is an object of the present invention to provide for a polymeric adhesive tape including a first polymeric adhesive layer which is a heat activated film and a second polymeric adhesive layer which is a heat activated film.

It is also an object of the present invention to provide an article including a support surface, a first member shaped and dimensioned for application to the support surface, and a polymeric adhesive tape securing the member to the support surface.

It is another object of the present invention to provide a method for bonding adjacent sheets to a substrate, wherein adjacent edges of a first sheet and a second sheet define a seam between the first sheet and the second sheet. The method is accomplished by preparing a substrate for application of a first sheet and a second sheet, positioning a polymeric adhesive tape on the substrate at a position along which the seam between the first sheet and the second sheet will be located, wherein the polymeric adhesive tape includes a first polymeric adhesive layer and a second polymeric adhesive layer, laying the first sheet and the second sheet on the substrate such that the seam between the first sheet and the second sheet lies along the polymeric adhesive tape, and heating the adhesive tape along the seam to bond the substrate, adhesive tape, first laminate and second laminate.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
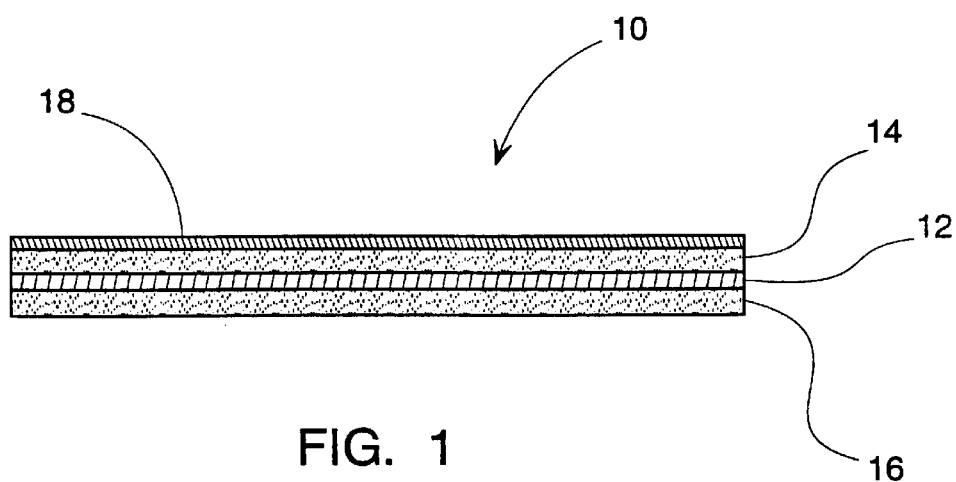
FIG. 1 is a cross sectional view of the present adhesive tape.

With reference to FIG. 1, the adhesive tape 10 of the present invention generally includes a high tensile strength moisture barrier layer 12 sandwiched between a top polymeric adhesive layer 14 and a bottom polymeric adhesive layer 16. In alternate embodiments where a moisture barrier is not necessary, the adhesive tape may simply be composed of a top polymeric adhesive layer and a bottom polymeric adhesive layer. In addition, a release sheet 18 may be attached to the top and/or bottom layers where appropriate.

The top and bottom adhesive layers 14, 16 may both be thermoplastic, may both be thermosetting, or one may be thermoplastic and the other may be thermosetting. As will be discussed in greater detail below, specific decisions regarding the use of thermosetting and/or thermoplastic adhesive layers are based upon the application for which the adhesive tape 10 is intended.

The top and bottom adhesive layers 14, 16 utilized in accordance with the preferred embodiment of the present invention generally comprise (i) a thermoplastic terpolymer of an $\alpha$-olefin, carbon monoxide, and an ethylenically unsaturated carboxylic ester monomer, and (ii) a thermosetting resin.

The thermoplastic or thermoset nature of the top or bottom adhesive layer 14, 16 is determined by varying the percentage of the thermoplastic terpolymer versus the thermosetting resin. Generally, where the layer includes more than approximately 5% by weight of the thermosetting resin, the resulting layer will exhibit thermoset characteristics. Where the layer includes less than approximately 5% by weight of the thermosetting resin, the resulting layer will exhibit thermoplastic characteristics.

The $\alpha$-olefin in the terpolymer of the present invention generally comprises at least 2 carbon atoms. Preferably, the $\alpha$-olefin comprises from about 2 to about 8 carbon atoms, more preferably from about 2 to about 4 carbon atoms, and most preferably from about 2 to about 3 carbon atoms. Preferable examples of suitable $\alpha$-olefins include ethylene, propylene and butylene. Most preferably, the $\alpha$-olefin utilized in the present invention is ethylene.

The ethylenically unsaturated carboxylic ester monomers in the terpolymer of the present invention are selected from the group of vinyl esters of saturated carboxylic acids and alkyl esters of an $\alpha,\beta$-ethylenically unsaturated carboxylic acids. Examples of suitable ester monomers include methyl acrylate, ethyl acrylate, butyl acrylate, isobutyl acrylate, methyl methacrylate, diethyl maleate, dimethyl fumarate, vinyl acetate, vinyl propionate and the like. The terpolymer preferably contains one of the following ester monomers: methyl acrylate, ethyl acrylate and vinyl acetate. Most preferably, the third monomer is ethylene vinyl acetate.

The weight percentages of the various terpolymer components of $\alpha$-olefin, carbon monoxide and ethylenically unsaturated carboxylic ester monomer are generally selected to provide the terpolymer with desired physical properties for the adhesive application. The terpolymer of the present invention generally comprise in the range of about 40 to about 95 weight percent $\alpha$-olefin, in the range of about 1 to about 15 weight percent carbon monoxide, and in the range of about 4 to about 45 weight percent ethylenically unsaturated carboxylic ester, all based on the total weight of $\alpha$-olefin, carbon monoxide, and ethylenically unsaturated carboxylic ester. The terpolymer preferably comprises in the range of about 50 to about 80 weight percent $\alpha$-olefin, in the range of about 5 to about 12 weight percent carbon monoxide, and in the range of about 15 to about 38 weight percent ethylenically unsaturated carboxylic ester. More preferably, the terpolymer comprises in the range of about 60 to about 70 weight percent $\alpha$-olefin, in the range of about 7 to about 10 weight percent carbon monoxide, and in the range of about 23 to about 30 weight percent ethylenically unsaturated carboxylic ester.

The desired end use application dictates whether the top or bottom adhesive layer 14, 16 is to be adhered before the other. Thus, the terpolymer and the thermosetting resin are selected to provide the desired terpolymer melt temperature ($T_M$) and desired set temperature of the thermosetting resin.

For example, where an adhesive tape includes a thermosetting adhesive layer and a thermoplastic adhesive layer, and it is desired that the thermoplastic adhesive layer be adhered first, the terpolymer must be selected so that its melt temperature ($T_M$) is less than the set temperature of the thermosetting resin. In such an instance, the terpolymer is selected so that its melt temperature ($T_M$) is preferably at least 10° C. less than the set temperature of the thermosetting resin, more preferably in the range of about 30° C. to about 40° C. less. The range in temperature allows an individual to bond the thermoplastic layer before the thermosetting layer in a controlled manner.

As another non-limiting example, where it is desired that the thermosetting adhesive layer be bonded before the thermoplastic adhesive layer, the thermosetting adhesive layer is generally activated first and bonded to a support surface with the thermoplastic adhesive layer in an unmelted state. Where such a bonding procedure is desired, the terpolymer of the thermoplastic adhesive layer must be selected so that its melt temperature ($T_M$) is greater than the set temperature of the thermosetting resin of the thermosetting adhesive layer. For such an instance, the terpolymer is selected so that its melt temperature ($T_M$) is preferably at least 10° C. greater than the set temperature of the thermosetting resin, more preferably in the range of about 30° C. to about 40° C. greater. Where it is desired to manufacture the layers from similar materials (that is, the melt temperature of the terpolymer and the set temperature of the thermosetting resin are the same for both layers), it may not be practical to extrude the layers. As such, the layers would preferably be manufactured through a cast solvent system.

Where an adhesive tape includes thermosetting top and bottom adhesive layers, the set temperatures should be selected to that the layer which is to set first has the lower set temperature. The difference in the set temperatures is preferably at least 10° C., more preferably in the range of about 30° C. to about 40° C.

The melt flow index of the copolymer of an α-olefin, carbon monoxide and an ethylenically unsaturated carboxylic ester monomer utilized in accordance with the present invention is generally selected to provide the copolymer with the desired physical properties for the adhesive application. Generally, the melt flow index will be in the range of about 0.5 to about 100, preferably in the range of about 1 to about 50, and more preferably in the range of about 5 to about 40.

Methods and catalysts for obtaining the terpolymer of the present invention are well known to those skilled in the art. In fact, such terpolymers are commercially available. Non-limiting examples of commercially available terpolymers useful in the present invention include Du Pont's ELVALOY 742, an ethylene, vinyl acetate, carbon monoxide terpolymer, with a melt index of 35.0±10 (modified ASTM D1238), with a composition of 28.5±1 weight percent vinyl acetate, 9.0±1 carbon monoxide, with the balance ethylene; Du Pont's ELVALOY HP441, an ethylene, vinyl acetate, carbon monoxide terpolymer, with a melt index of 8.0±7 (modified ASTM D1238); and Du Pont's ELVALOY 4924, an ethylene, vinyl acetate, carbon monoxide terpolymer, with a melt index of 15.0±8 (modified ASTM D1238), with a composition of 20.5±2 weight percent vinyl acetate, 8.0±1 carbon monoxide, with the balance ethylene.

It should be understood that more than one terpolymer as described above may be utilized in each of the top and bottom adhesive layers, without departing from the spirit of the present invention.

The thermosetting resin of the present invention may be any suitable thermosetting resin having a desired set temperature that will provide suitable adhesive properties for the desired application. Non-limiting examples of suitable thermosetting resins include phenolic, melamine, urea formaldehyde, amino, epoxy, polyester, silicon, acrylic, urethanes, and diallyl phthalate resins, just to name a few. The preferred resins are phenolic and melamine, with phenolic resins being the most preferred. It should be understood that more than one thermosetting resin may be utilized in the composition and film without departing from the spirit of the present invention.

As explained above, the thermoplastic or thermoset nature of the top and bottom adhesive layers is determined by the relative amounts of terpolymer and thermosetting resin present in the layer. Layers having less than approximately 5% by weight thermosetting resin are considered thermoplastic, and layers having more than approximately 5% by weight thermosetting resin are considered thermoset.

Each of the top and bottom adhesive layers 14, 16 may include additives as are well known to those in the adhesive art, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

The moisture barrier layer 12 of the present invention is generally a barrier for certain targeted liquids which may adversely affect the substrate, laminate or bond therebetween. In addition, the moisture barrier layer 12 also may be adapted to add tensile strength to the adhesive tape 10.

In accordance with the preferred embodiment of the present invention, the moisture barrier layer 12 is a polyethylene terephthalate (PET) sheet, for example, MYLAR™, coated on one or both sides with aluminum. The aluminum is preferably vapor deposited on the PET sheet.

The aluminum coating aids in the uniform transfer of heat across the adhesive tape 10. The aluminum coating also enhances the bond strength of the moisture barrier layer 12 to the top and bottom adhesive layers 14, 16. However, coating the PET sheet adds expense and the preferred embodiment employs a moisture barrier layer 12 with only one side coated with aluminum, although the sheet may be coated on both sides without departing from the spirit of the present invention.

A wide variety of methods for making film from thermoplastic or thermoset polymers are known to exist, such as molding thin films, blow molding, utilizing rollers, or by extruding. The following non-limiting examples are provided merely to illustrate the possible manufacturing techniques for the present adhesive tape and are not meant to limit the scope of the claims of the present invention. The preferred method for making the adhesive tape 10 of the present invention is by separate extrusion of the top adhesive layer 14, barrier layer 12 and bottom adhesive layer 16. The top and bottom adhesive layers 14, 16 may then be nipped to the barrier layer 12 to form the final three layer adhesive tape 10. The layers may also be coextruded.

For example, the top polymeric adhesive layer 14 is made by metering the base polymer, Elvaloy 742, into the main feed throat of the twin screw extruder at a rate of 12 pounds per hour. Also metered into the main feed throat is 3 pounds per hour of Georgia Pacific-5520, powdered phenolic resin. The barrels are maintained at 70° C. and the die is set at 80° C. Cooling is possible on the barrels, but the die is air cooled only. The resulting extruded film is light yellow in color and homogeneous to the naked eye.

The top polymeric adhesive layer 14 could be cast onto chilled rolls of a three-roll stack and wound into a roll of film. The film may then be pressure nipped to the moisture barrier layer 12 of aluminized PET, or neat PET, in a separate step. This film layer (top polymeric adhesive layer) could also be directly extruded onto a PET film support and the two-layer structure wound into a roll.

As to the moisture barrier layer 12, PET film or aluminized PET is commercially available. The PET films are available from DuPont under the trade name MYLAR™ or from other manufacturers. Metallizing of PET is often done by converting companies that buy PET film from a manufacturer and then apply the metal layer, usually by vapor deposition, in a separate step. Metallized PET is available in many gauges and is available with one or both sides coated with the thin layer of metal.

The bottom polymeric adhesive layer 16 is made by metering the base polymer, Elvaloy 742, into the main feed throat of the twin screw extruder at a rate of 12 pounds per hour. Also metered into the main feed throat is 3 pounds per hour of Atomite@, powdered calcium carbonate. The barrels are maintained at 70° C. and the die is set at 80° C. Cooling is possible on the barrels but the die is air cooled only. The resulting extruded film is a translucent white color and homogeneous to the naked eye.

The bottom polymeric adhesive layer 16 could be cast onto the chilled rolls of a three-roll stack and then wound into a roll of film. The roll of film could then be pressure nipped onto a film of PET (that is, the moisture barrier layer).

If the three layer adhesive tape 10 is to be made sequentially, it is important to extrusion apply the bottom adhesive layer 16 to the PET layer (barrier layer 12) before applying the top adhesive layer 14. This is done to minimize the heat history of top adhesive layer in the event the top adhesive layer is thermosetting.

The top and bottom adhesive layers 14, 16 may also be simultaneously extruded onto the preexisting PET film using two extruders to feed a die equipped with two sets of openings and a slot between them. In theory, a film of PET could pass between the two openings and simultaneously be coated with the two different extruded adhesive layers. The resulting film would be chilled to, or below, room temperature and then pressure nipped to a release sheet of paper or polymeric film.

A release sheet 18 may be used in conjunction with the present adhesive tape. The release sheet would be applied to the free side of the top or bottom adhesive layer to prevent the adhesive tape from sticking to itself when it is in roll form. As will be discussed below in greater detail, the release sheet 18 also facilitates the manufacture of articles with the present adhesive tape 10. Where the adhesive tape 10 is employed along the seam between sheets of decorative laminates, the release sheet 18 is pulled away from the assembly when the components are properly positioned and prepared for the final heating step.

Release sheets 18 are commercially available. In accordance with the preferred embodiment of the present invention the release sheet 18 may be a silicone treated paper or a film of polyolefin, such as polyethylene or polypropylene.

The adhesive tape 10 of the present invention finds utility in a wide variety of applications. In general, the adhesive tape 10 is suitable for providing an adhesive backing to a wide variety of materials, and for adhesively bonding a first surface to a second surface. In particular, the adhesive tape 10 is well suited for bonding decorative laminates, or other decorative surfacing materials, to a substrate.

Applications for the present adhesive tape 10 will now be discussed in detail. However, the following discussion is not intended to be limiting, but rather exemplary of the many applications for which the present adhesive tape 10 is suited.

In general, products of the present invention are formed by applying the adhesive tape 10 of the present invention between a substrate and an object to be secured thereto. For example, the adhesive tape 10 may be applied to a structural member such as particle board, or the like, to allow for convenient bonding of decorative laminates, or other decorative surfacings, thereto. As another example, the adhesive tape 10 may be applied to wall paper, coverings or panels, or floor coverings such as tile, vinyl, synthetic stone, or stone, to allow for convenient application of these items.

Figure 2:
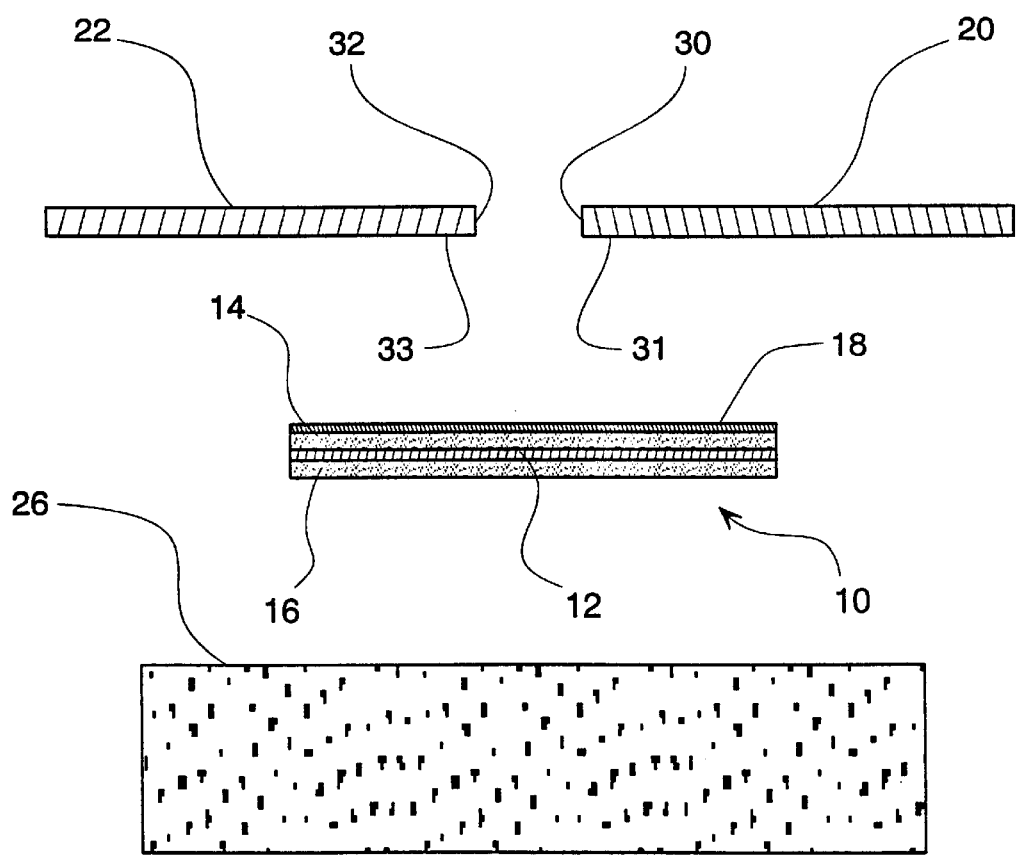
FIG. 2 is a cross sectional exploded view of the present adhesive tape used in the application of decorative laminates along a seam.
Figure 3:
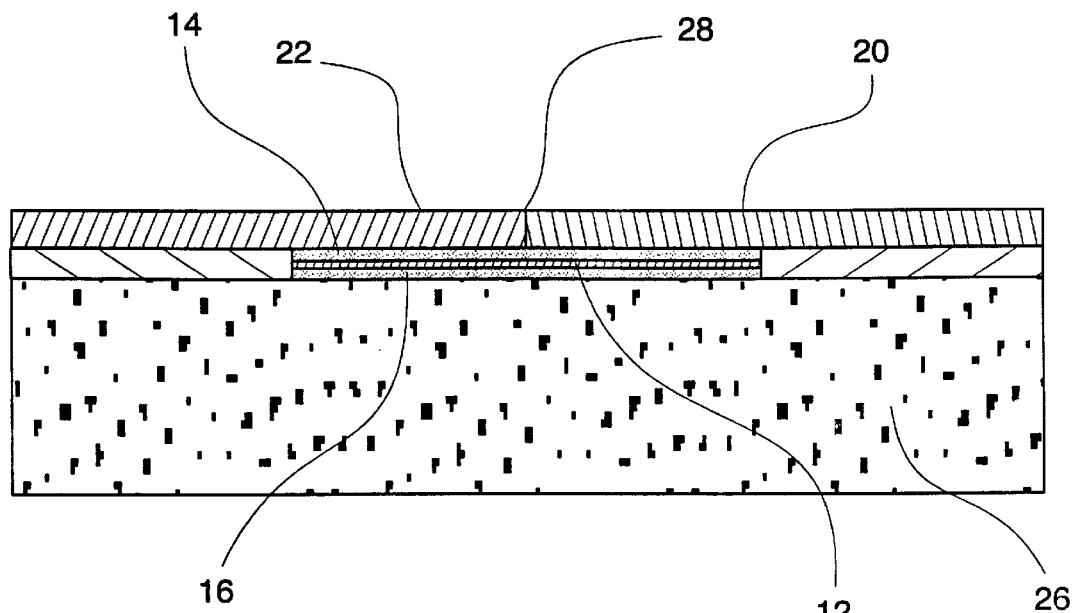
FIG. 3 is a cross sectional view of the present adhesive tape used in the application of decorative laminates along a seam.

With reference to FIGS. 2 and 3, the present adhesive tape 10 is used to bond decorative laminates 20, 22 to a substrate 26 along a seam 28. Briefly, the substrate 26, for example, particle board commonly used in the manufacture of countertops, is prepared for application of a first decorative laminate sheet 20 and a second decorative laminate sheet 22. The substrate 26 is prepared by marking the substrate to identify the desired position of the seam 28 on the finished product.

Figure 4:
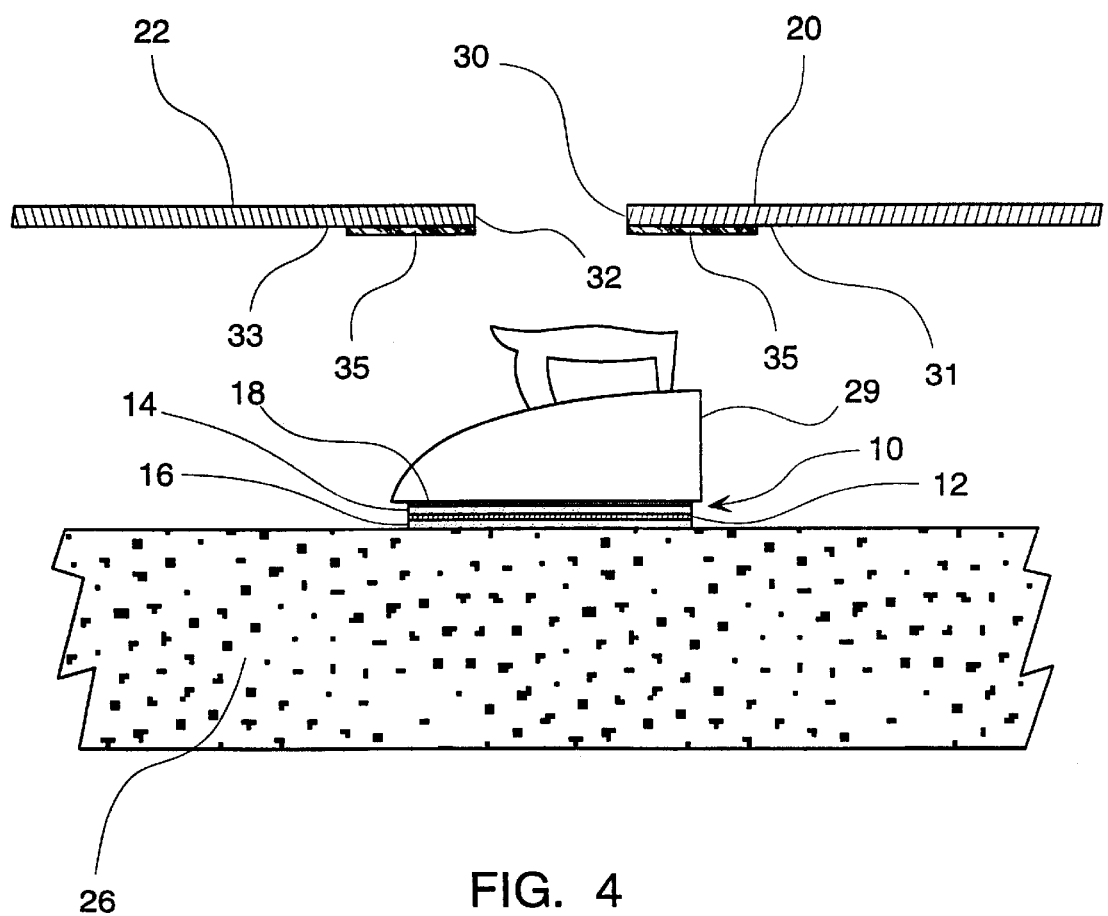
FIGS. 4–11 are cross sectional views of the steps employed in bonding decorative laminates along a seam in accordance with the present invention.

With reference to FIGS. 4–11, the steps employed in applying decorative laminates along a seam 28 are disclosed. Referring to FIG. 4, a polymeric adhesive tape 10 in accordance with the present invention is placed on the substrate 26 at a position along which the seam 28 between the first decorative laminate sheet 20 and the second decorative laminate sheet 22 will be located. The polymeric adhesive tape 10 includes a top polymeric adhesive layer 14 exhibiting thermosetting characteristics and a bottom polymeric adhesive layer 16 exhibiting thermoplastic characteristics. The adhesive tape 10 also includes a moisture barrier middle layer 12 between the top and bottom polymeric adhesive layers 14, 16. A release sheet 18 covers the top polymeric adhesive layer 14.

The polymeric adhesive tape 10 is placed on the substrate with the bottom polymeric adhesive layer 16 in contact with the substrate 26 and the top polymeric adhesive layer 14 upwardly facing. The adhesive tape 10 is then heated, preferably with a manually controlled iron 29, to a first temperature at which the bottom polymeric adhesive layer 16 is activated and the adhesive tape 10 bonds to the substrate 26. The first temperature should be sufficient to activate the bottom polymeric adhesive layer 16, but insufficient to activate the top polymeric adhesive layer 14.

The bottom surfaces 31, 33 of first and second decorative laminate sheets 20, 22, respectively, are then covered with masking tape 35 where they are intended to contact the top adhesive layer 14 of the adhesive tape 10. In accordance with the preferred embodiment of the present invention, masking tape 35 is applied to the bottom surfaces 31, 33 of the first and second laminate sheets 20, 22 adjacent the respective edges 30, 32 of the first and second decorative laminate sheets 20, 22 which define the seam 28. The masking tape 35 on each sheet covers an area approximately half the width of the tape 10.

Figure 5:
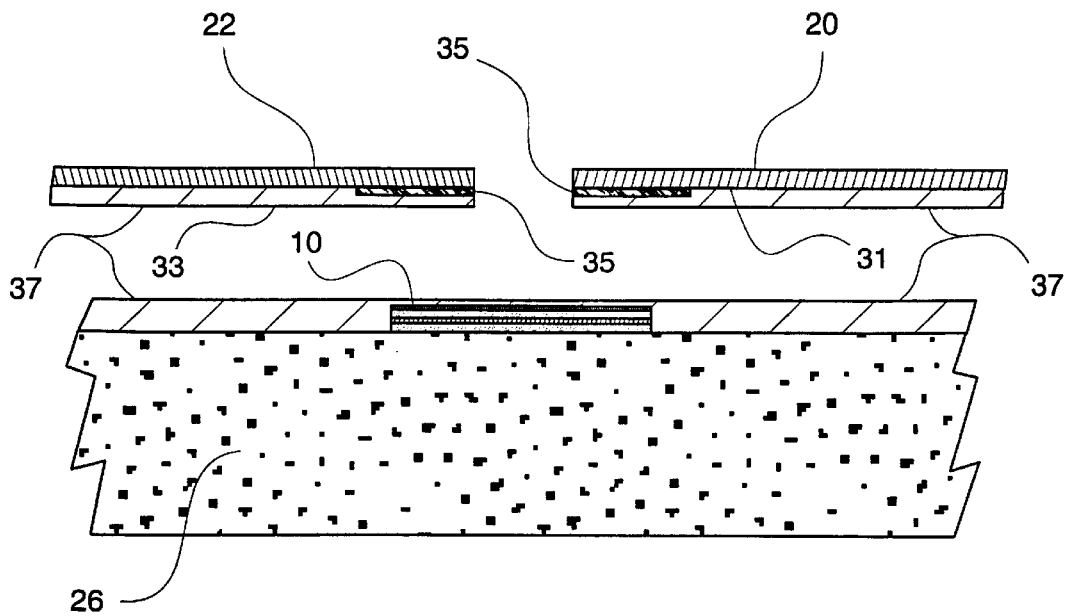

With reference to FIG. 5, once the bottom surfaces 31, 33 of the decorative laminate sheets 20, 22 are properly covered, the remainder of the bottom surfaces 31, 33 of the first and second decorative laminate sheets 20, 22 are treated with traditional contact adhesive 37. At the same time, the substrate 26 is sprayed with contact adhesive 37, the release sheet 18 is removed from the adhesive tape 10, and the substrate 26 is permitted to sit until the contact adhesive also tacks.

Figure 6:
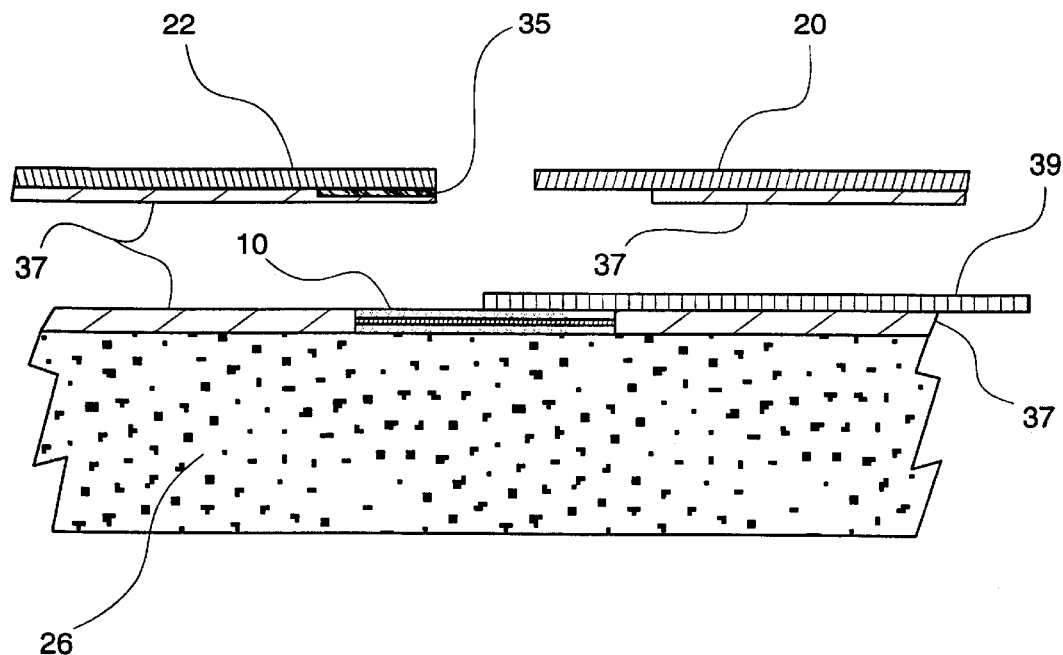
Figure 7:
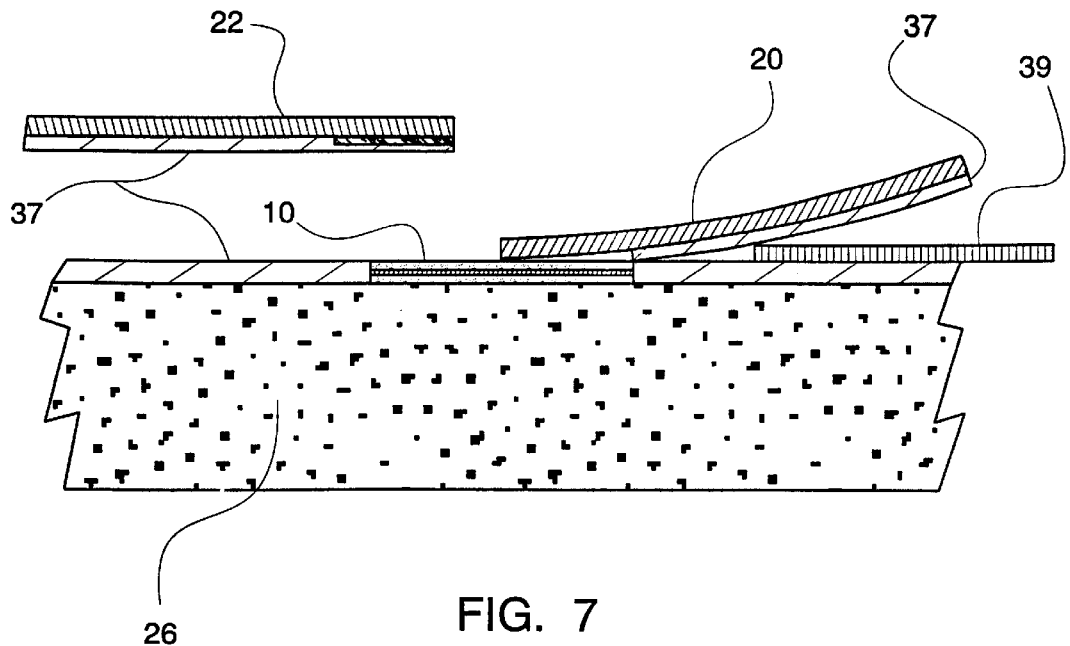
Figure 8:
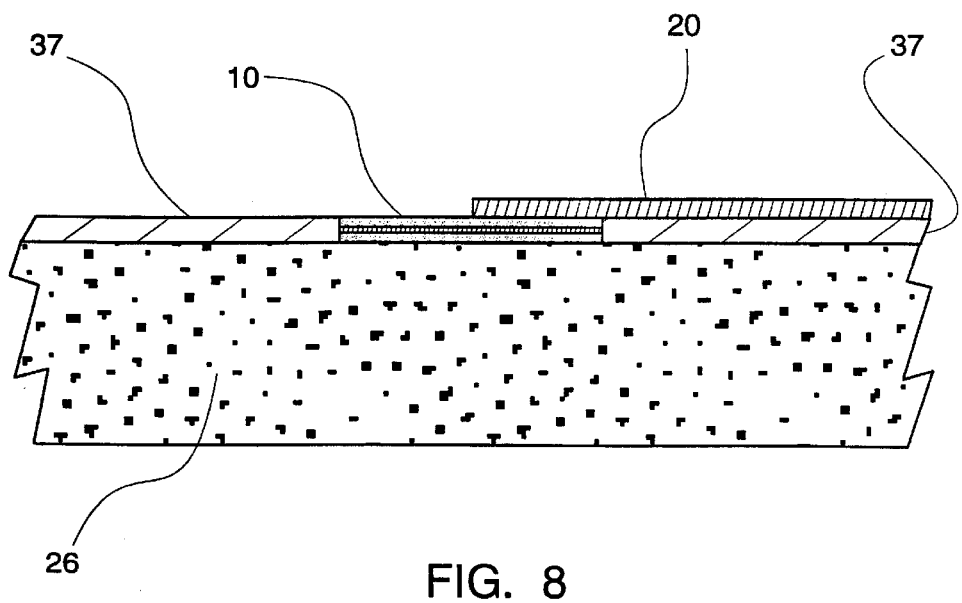

Referring to FIG. 6, once the contact adhesive applied to the decorative laminate sheets 20, 22 and the substrate 26 tacks, a slip sheet 39 is placed along the substrate 26 where the first decorative laminate sheet 20 is to be placed. The masking tape 35 is then removed from the first decorative laminate sheet 20. The first decorative laminate sheet 20 is laid on the slip sheet 39, the slip sheet 39 is removed and the first decorative laminate sheet 20 is rolled in a traditional manner to cause bonding to the substrate 26 (see FIG. 8).

Figure 9:
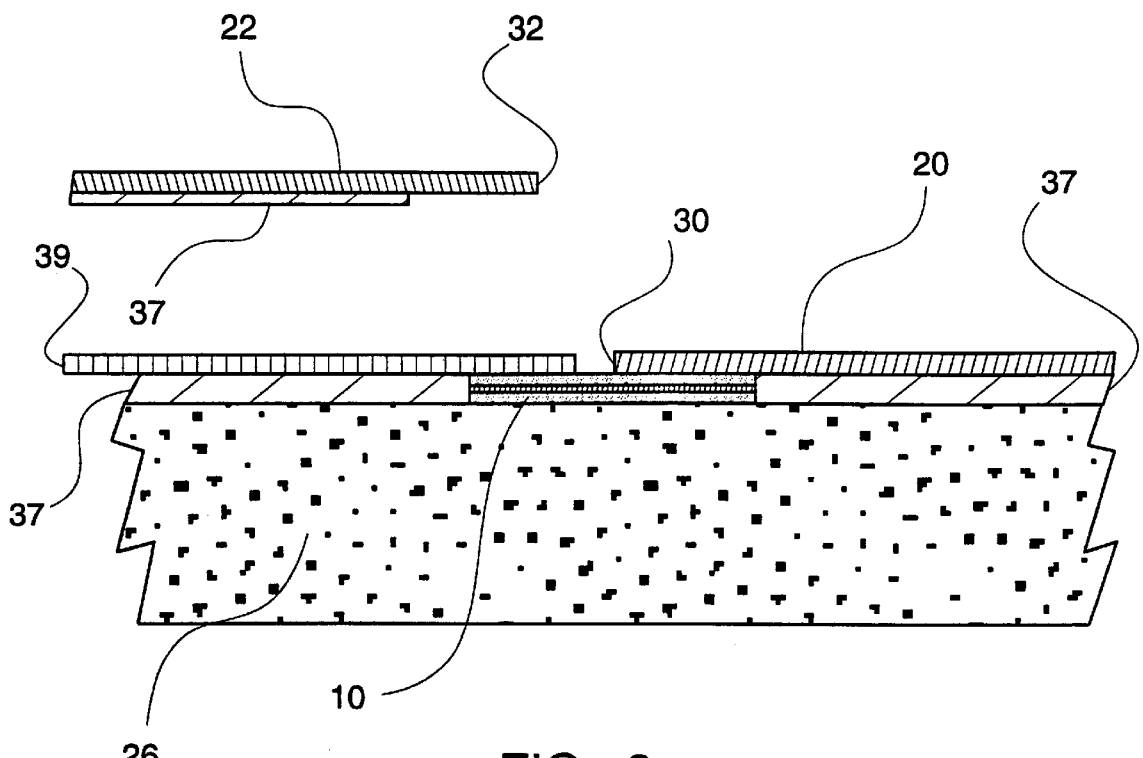
Figure 10:
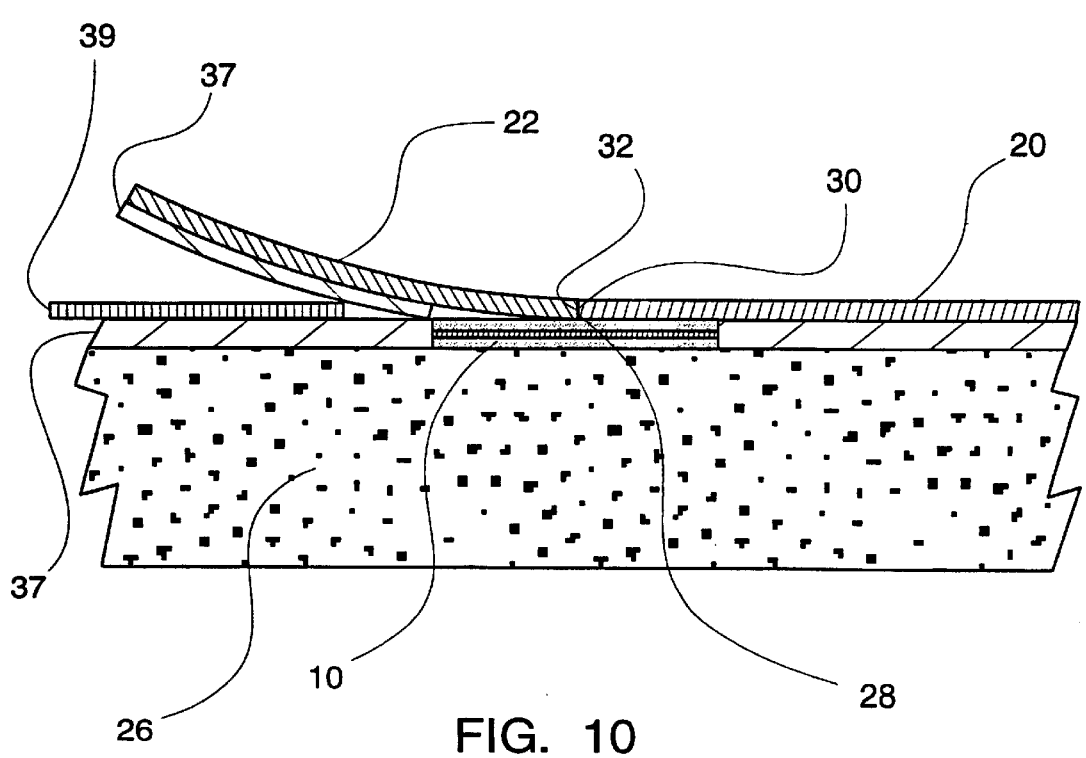
Figure 11:
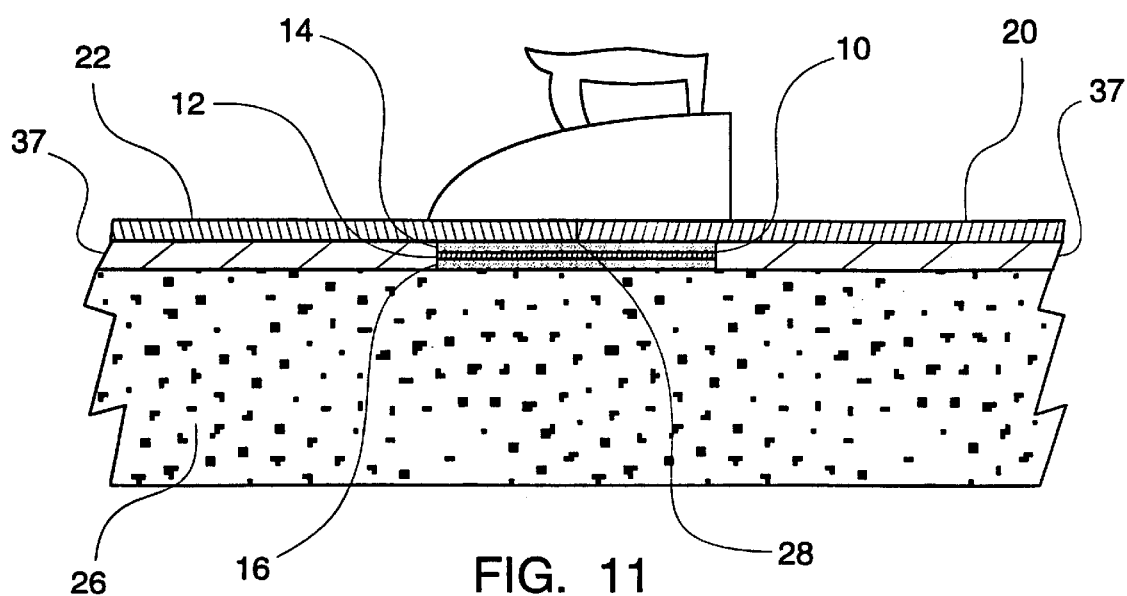

A slip sheet 39 is then placed along the substrate 26 where the second decorative laminate sheet 22 is to be placed (see FIG. 9). The masking tape 35 is then removed from the second decorative laminate sheet 22. The edge 32 of the second decorative laminate sheet 22 is aligned with the edge 30 of the first decorative laminate sheet 20 along the seam 28. The slip sheet 39 is then removed and the second decorative laminate sheet 22 is rolled and bonded in a traditional manner (see FIG. 10). With reference to FIG. 11, the adhesive tape 10 is then heated to a second temperature, greater than the first temperature, to activate the thermosetting top adhesive layer 14, which then bonds the first and second decorative laminate sheets 20, 22 to the substrate along the seam 28. Preferably, the heat is applied with a platen iron 29 on the top surface of the decorative laminate sheets 20, 22. The resulting seam 28 is rigid bonded, while the remaining position of the bond between the decorative laminate sheets 20, 22 and the substrate 26 may move somewhat under environmental conditions based upon the characteristics of the contact adhesive.

With regard to the problems associated with traditional adhesives discussed above, the present adhesive tape 10 overcomes these problems by providing a linking member which is both moisture impermeable and structurally stable. Specifically, the PET moisture barrier layer 12 sandwiched between the top and bottom layers 14, 16 of the adhesive tape 10 prevents the penetration of harmful moisture to the substrate 26. This prevents the warping, splitting, cracking and delamination found along the seams 28 of decorative laminate products, and particularly, countertops.

In addition, the adhesive tape 10, and particularly the PET moisture barrier layer 12 sandwiched between the top and bottom layers 14, 16, adds substantial structural stability along the seam 28. The adhesive tape 10 forms a rigid bonded seam which securely links the first and second decorative laminate sheets 20, 22. In this way, the strength of the adhesive tape 10 prevents the first and second laminates 20, 22 from pulling apart as the substrate 26 expands and contracts.

The thermoset top layer 14 also prevents accidental resetting of the bond in the event something hot is placed upon the countertop. For example, if one where to place a hot pot on the countertop, the bond between the first and second decorative laminates 20, 22 would be unaffected as the heat from the pot would not break down the thermosetting top polymeric adhesive layer 14 linking the first and second decorative laminate sheets 20, 22.

The adhesive tape 10 further allows the first and second decorative laminate sheets 20, 22 to register such that their surface profiles are substantially coplanar in contrast to prior art seams exhibiting noticeable and undesirable profile differences. This prevents the appearance of an uneven joint along the seam 28 connecting the first and second decorative laminates 20, 22. In fact, the iron acts as a platen to press the decorative laminate sheets 20, 22 in much the same way a wrinkle is pressed out of a shirt.

Figure 12:
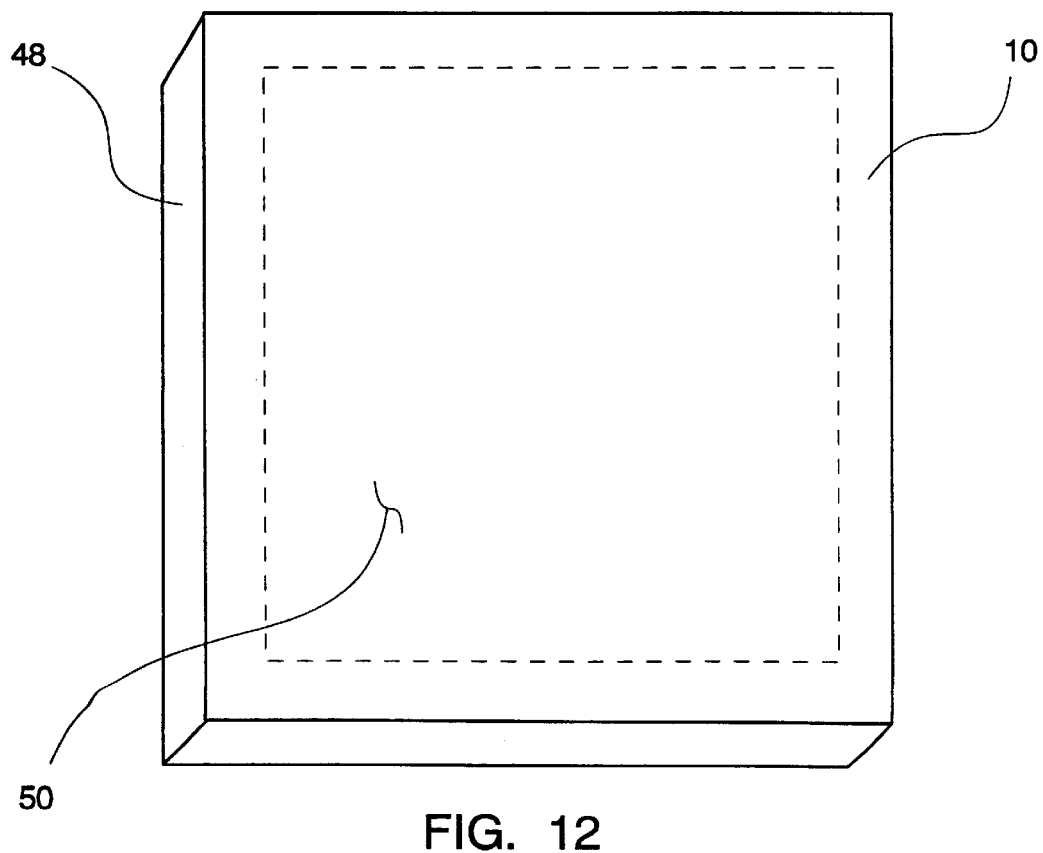
FIG. 12 is a top view of the present adhesive tape used in the perimeter bonding of a decorative laminate to a substrate.

It is commonly within the decorative laminate field to perimeter bond a laminate to a substrate by applying EVA and PVA adhesive about the perimeter of the substrate and apply the decorative laminate thereon. With reference to FIG. 12, the present adhesive tape 10 may also be used in perimeter bonding applications as a replacement for traditional EVA and PVA adhesives. The use of the present invention allows the creation of a rigid bond without the problems associated with liquid adhesive commonly used in the field.

Specifically, the adhesive tape 10 is applied about the perimeter of the substrate 48 and heated to bond the adhesive tape 10 thereto. The decorative laminate 50 is then placed on the adhesive tape 10, and the substrate 48, and the tape 10 is once again heated with a platen iron to secure the decorative laminate 50 to the adhesive tape 10, and the substrate 48.

Figure 13:
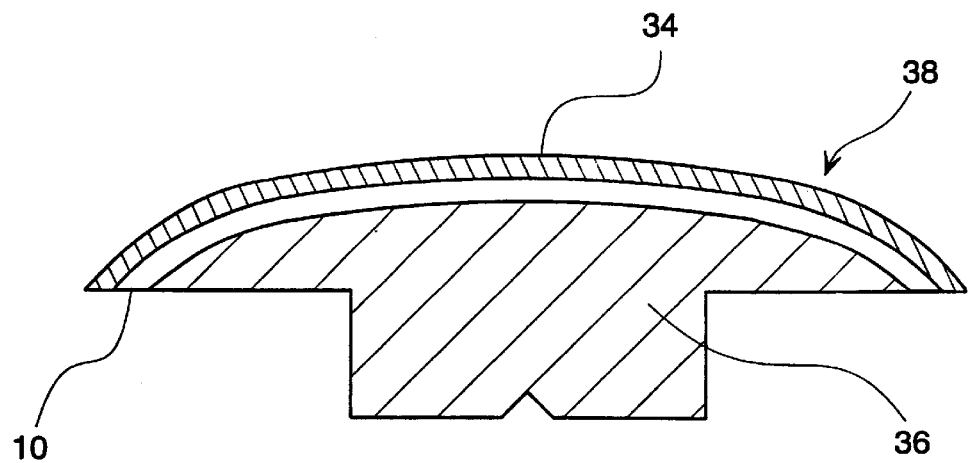
FIG. 13 is a cross sectional view of the present adhesive tape used in the fabrication of decorative laminate molding.

A further application of the present adhesive tape is shown in FIG. 13. In accordance with this application, the present adhesive tape 10 bonds a decorative laminate 34 to a substrate 36 in the production of decorative laminate molding 38. The adhesive tape 10 is positioned between the decorative laminate 34 and the substrate molding 36. The decorative laminate 34 is heated before being brought into contact with the substrate 36 and the adhesive tape 10. The decorative laminate 34, thereby, heats the adhesive tape 10, causing the adhesive tape 10 to bond the decorative laminate 34 to the substrate 36.

By bonding the decorative laminate 34 to the substrate 36 in this way, the mess associated with the use of liquid adhesive is obviated. In addition, the critical temperature and relative humidity concerns associated with the use of traditional adhesives are obviated. In addition, since the use of the present adhesive tape 10 does not require liquid adhesive, there is no need to include extra substrate on each end of the molding to prevent the adhesive from getting into the machinery, thus providing a material cost savings and reduced downtime.

The use of the present adhesive tape 10 between the substrate 36 and decorative laminate 34 minimizes problems associated with the telegraphing of any imperfections, flaws, or glue build up in the surface finish of the molding substrate through the decorative surface of the laminate 34. Specifically, the present adhesive tape 10 creates an additional layer between the decorative laminate 34 and the substrate 36 which substantially prevents telegraphing of imperfections and flaws through the decorative laminate 34 when it is bonded to the substrate.

Where the present adhesive tape 10 is used in the manufacture of decorative laminate molding as discussed above, the tape 10 may be manufactured with both thermoplastic top and bottom adhesive layers. Since it is highly unlikely that molding will be exposed to heat which would reset the thermoplastic bond, it may not be necessary to employ thermoset adhesive layers in accordance with this application of the present adhesive tape 10. In addition, it may be desirable to employ an adhesive tape 10 which does not include a barrier layer between the top and bottom adhesive layers. It may also be desirable to employ an adhesive tape 10 composed of a single adhesive layer.

Figure 14:
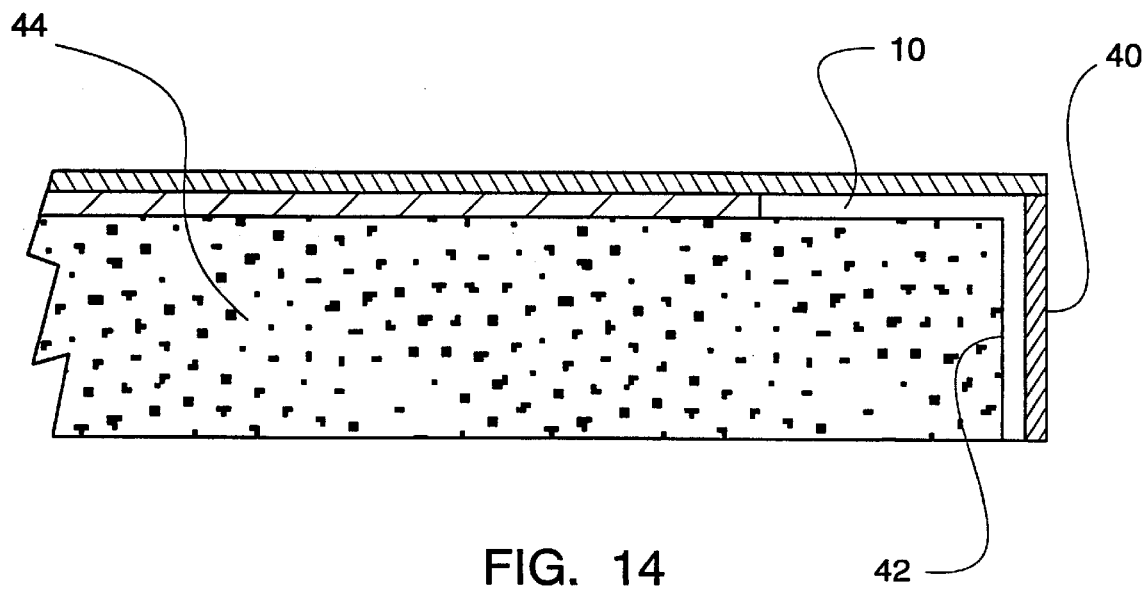
FIG. 14 is a cross sectional view of the present adhesive tape used in the application of a decorative laminate along the edge of a substrate.

With reference to FIG. 14, the present adhesive tape 10 may be used to attach a decorative laminate 40 to the edge 42 of a substrate 44; that is, the present adhesive tape 10 may be used to attach decorative laminate 40 along the edge 42 of a tabletop or a countertop. When used in this way, the present adhesive tape 10 prevents expansion and contraction from causing the end of the laminate 40 to extend beyond the substrate 44 in a position where it may subsequently be chipped from the substrate 44. In fact, when the adhesive tape 10 is used to apply decorative laminates in this way, the ends of the substrate 44 are no longer the weak point in the structure. The added structural stability thereby prevents the distal end of the decorative laminate edging 40 from moving beyond the end of the substrate 44 to a position where it may be chipped from the substrate 44. In addition, the use of the present adhesive tape 10 along the edges of decorative laminate products prevents moisture from undesirably affecting the seam.

Figure 15:
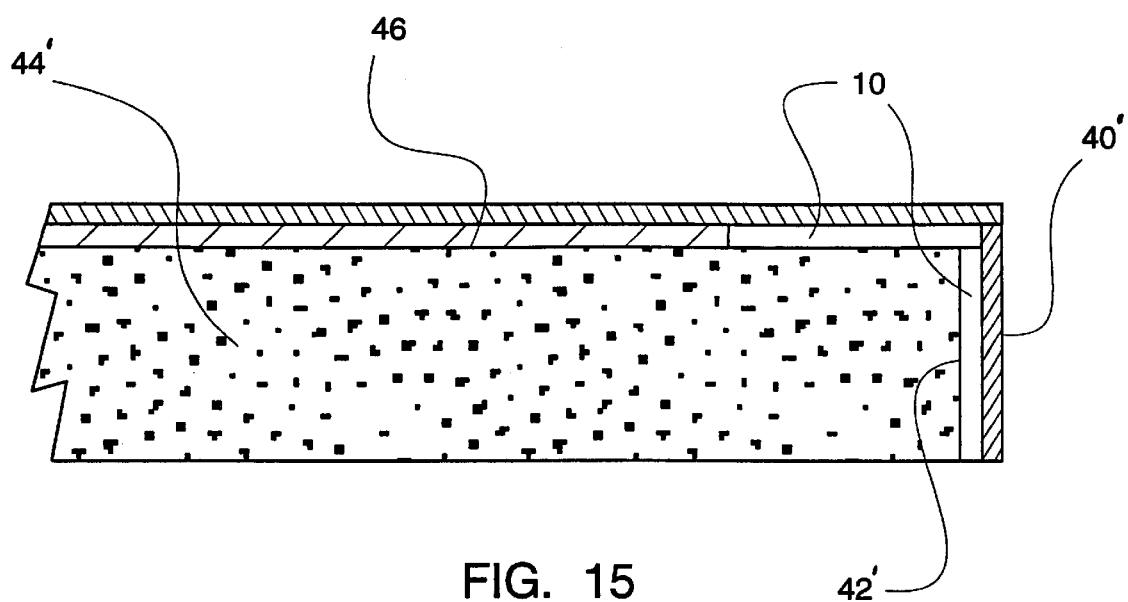
FIG. 15 is a cross sectional view of the present adhesive tape used in an alternate manner for applying decorative laminate along the edge of a substrate.

An alternate method for attaching laminate edging 40' to a substrate 44' is disclosed in FIG. 15. In accordance with this embodiment, strips of the present adhesive tape 10 are applied to both the edge 42' and the top surface 46 of the substrate 44'.

In addition to the applications discussed above, it is contemplated that the present adhesive tape may take on a wide variety of applications, including, but not limited to, laminate repair, full sheet application of decorative surfacings, molding and/or edging installation, label or wallpaper attachment, and carton sealing. Where the adhesive tape is utilized in a wide variety of applications, it is contemplated that the adhesive tape may take on a variety of forms. For example, and in addition to the various embodiments discussed above, a single polymeric adhesive layer may be used within the spirit of the present invention.

It is also contemplated that the barrier layer may take a variety of forms to suit various applications. For example, it is contemplated that a conductive barrier layer (for example, copper) may be employed where the adhesive tape functions as a conductor as well as a bonding material. Additional materials contemplated for use as the barrier layer include, but are not limited to, bronze, gold, and silver.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for bonding adjacent sheets to a substrate, wherein adjacent edges of a first sheet and a second sheet define a seam between the first sheet and the second sheet, comprising the following steps:

preparing a substrate for application of a first sheet and a second sheet;

positioning a polymeric adhesive tape on the substrate at a position along which the seam between the first sheet and the second sheet will be located, wherein the polymeric adhesive tape includes a first polymeric adhesive layer and a second polymeric adhesive layer;

laying the first sheet and the second sheet on the substrate such that the seam between the first sheet and the second sheet lies along the polymeric adhesive tape;

heating the adhesive tape along the seam to bond the substrate, adhesive tape, first sheet and second sheet; and wherein the steps of heating and laying include heating to a first temperature at which the first polymeric adhesive layer bonds to the substrate before laying the first sheet and the second sheet on the substrate, and subsequently laying the first sheet and the second sheet on the substrate and heating to a second temperature at which the second polymeric adhesive layer bonds to the first sheet and the second sheet.

2. The method according to claim 1, wherein the first polymeric adhesive layer is a thermoplastic adhesive layer and the first temperature is lower than the second temperature.

3. The method according to claim 2, wherein the second polymeric adhesive layer is a thermosetting adhesive layer.

4. The method according to claim 1, wherein the polymeric adhesive tape further includes a moisture barrier layer positioned between the first polymeric adhesive layer and the second polymeric adhesive layer.

5. The method according to claim 4, wherein the moisture barrier layer comprises a thermoplastic film.

6. The method according to claim 5, wherein the thermoplastic is PET.

7. The method according to claim 5, wherein the moisture barrier layer comprises metal and thermoplastic.

8. The method according to claim 7, wherein the metal is vapor deposited aluminum.

9. The method according to claim 1, wherein the polymeric adhesive tape further includes a release sheet coupled to the second polymeric adhesive layer.

10. The method according to claim 1, wherein the first sheet is a decorative laminate and the second sheet is a decorative laminate.

11. The method according to claim 10, wherein the steps of heating and laying include heating to a first temperature at which the first polymeric adhesive layer bonds to the substrate before laying the first sheet and the second sheet on the substrate, and subsequently laying the first sheet and the second sheet on the substrate and heating to a second temperature at which the second polymeric adhesive layer bonds to the first sheet and the second sheet.

12. The method according to claim 10, wherein the first polymeric adhesive layer is a thermoplastic adhesive layer and the first temperature is lower than the second temperature.

13. The method according to claim 12, wherein the second polymeric adhesive layer is a thermosetting adhesive layer.

14. The method according to claim 10, wherein the polymeric adhesive tape further includes a moisture barrier layer positioned between the first polymeric adhesive layer and the second polymeric adhesive layer.

15. The method according to claim 14, wherein the moisture barrier layer comprises a thermoplastic film.

* * * * *